UNITED STATES PATENT OFFICE.

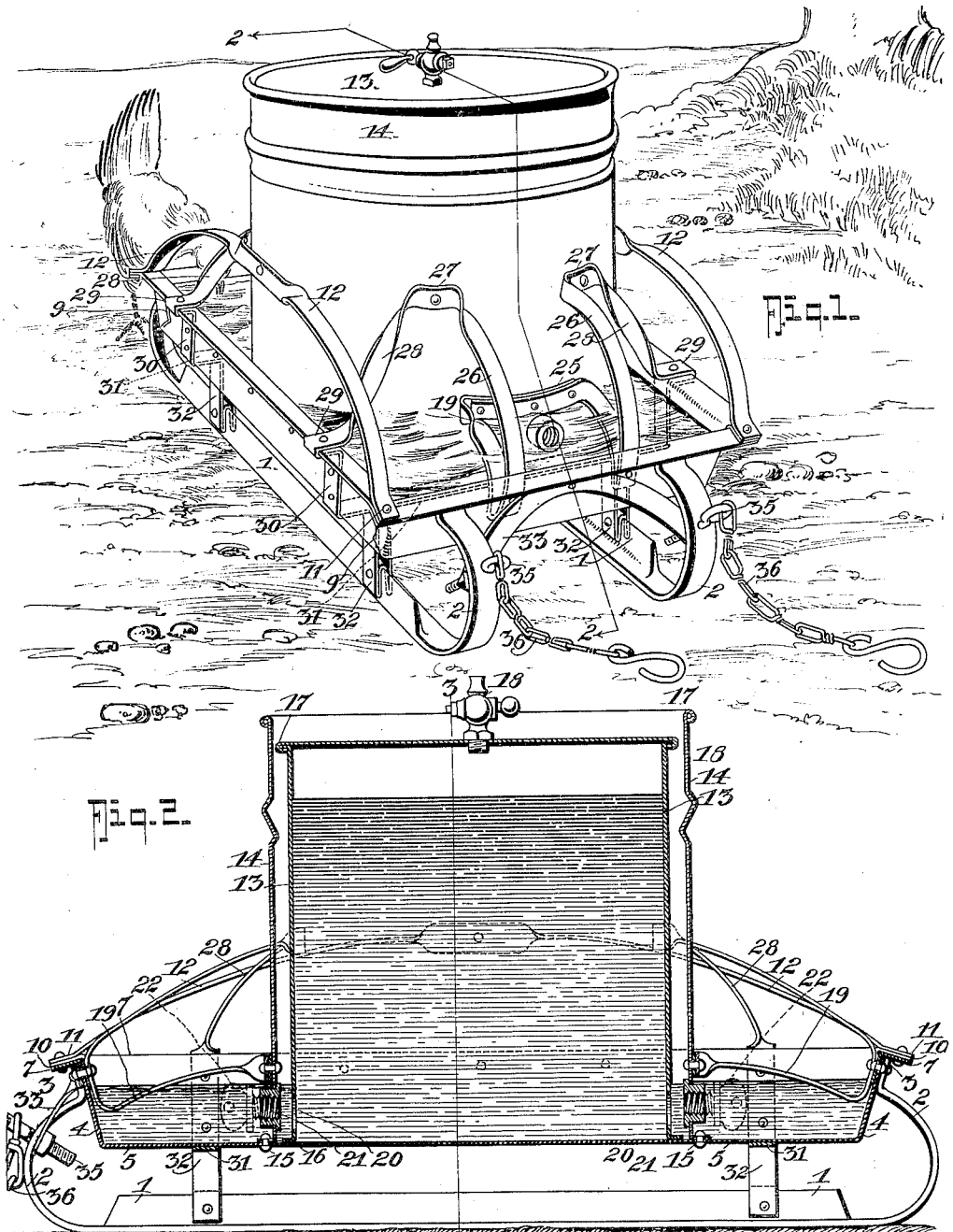
J. Q. CLARKE.
STOCK FOUNTAIN OR TROUGH.
APPLICATION FILED FEB. 4, 1913.
1,086,513.
Patented Feb. 10, 1914.
2 SHEETS—SHEET 1.

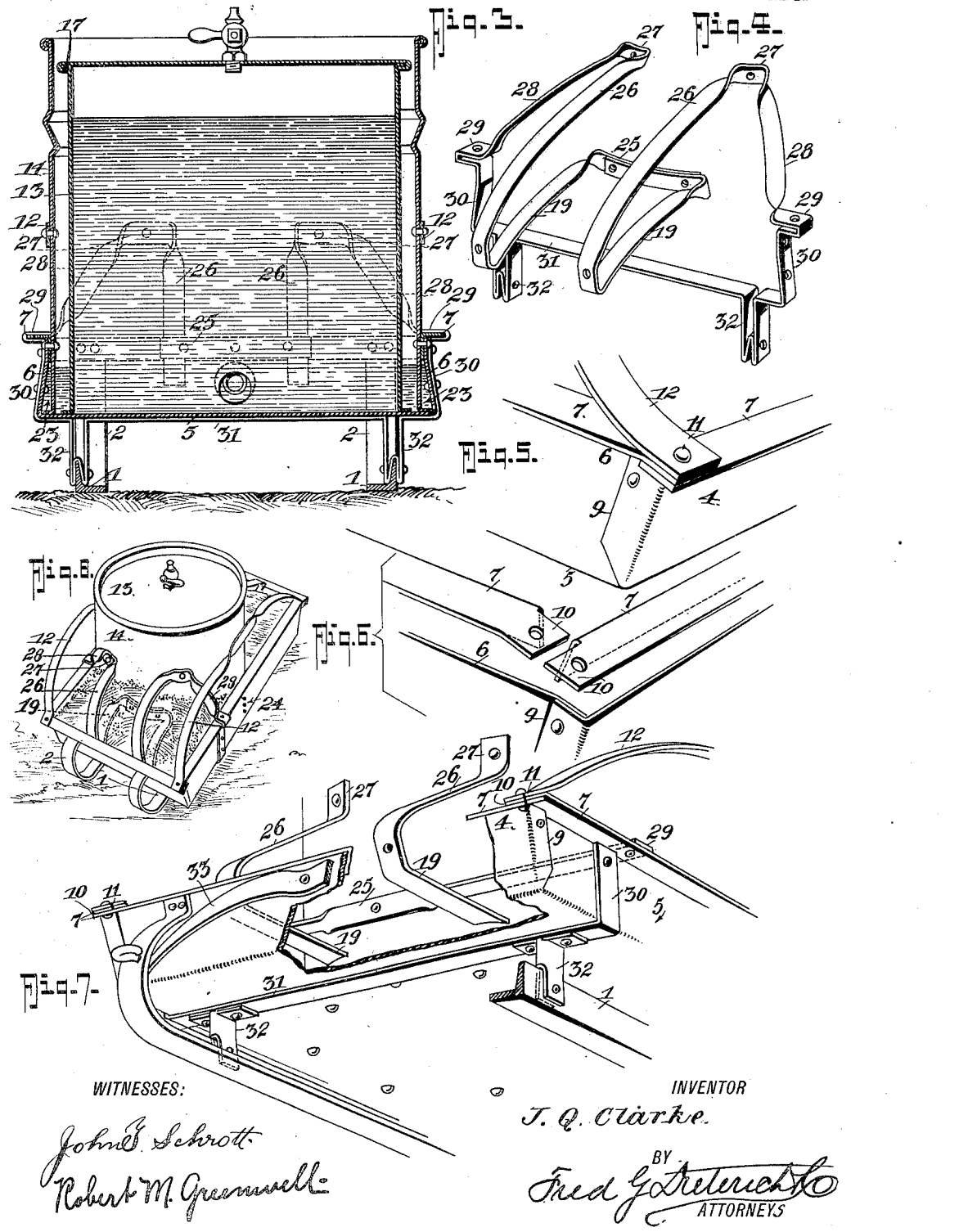

JOHN Q. CLARKE, OF CRAWFORDSVILLE, INDIANA.

STOCK FOUNTAIN OR TROUGH.

1,086,513.  Specification of Letters Patent.  Patented Feb. 10, 1914.

Application filed February 4, 1913. Serial No. 746,178.

*To all whom it may concern:*

Be it known that I, JOHN Q. CLARKE, residing at Crawfordsville, in the county of Montgomery and State of Indiana, have invented a new and Improved Stock Fountain or Trough, of which the following is a specification.

This invention has reference to feeders for stock, poultry and the like, and it primarily has for its object to provide a trough combined with means for automatically feeding water from a holder or storage tank into said trough for replenishing the water as it is consumed from the trough, and in which the several parts are so designed and combined whereby to produce an appliance of the character stated of a very simple, inexpensive and durable construction.

Another object of my invention is to provide a fountain or feeding trough having, among its parts, a suitably arranged sled or carrier on which is mounted a pan, within which the tank or holder is supported, and a specially arranged means for bracing the holder on the pan and the pan upon the sled.

Again my invention has for its purpose to provide a simple compact and easily handled stock feeding or watering appliance in which is embodied a water container and means coöperating therewith for keeping the water cool by protecting it from the excessive heat rays of the sun.

With other objects in view that will hereinafter appear my present invention is a stock fountain or trough that embodies the peculiar construction and novel arrangement of the parts hereinafter fully explained, specifically pointed out in the appended claims and illustrated in the accompanying drawings, in which:—

Figure 1 is a perspective view of my improved construction of stock fountain or trough. Fig. 2 is a vertical longitudinal section thereof, on the line 2—2 of Fig. 1, the plugs for the water feed openings to the trough sections being shown in dotted lines. Fig. 3 is a transverse section of the same taken on the line 3—3 on Fig. 2. Fig. 4 is a perspective view of the transverse bracing means, hereinafter specifically referred to and showing the preferred form thereof. Fig. 5 is a detail perspective view that illustrates one of the corner constructions of the trough. Fig. 6 is a similar view the parts being shown separated. Fig. 7 is a detail perspective view of a part of the sled, the tank, the holder, and a modified construction of one of the transverse bracing means, and Fig. 8 is a detail perspective view of my invention, showing a further modification thereof hereinafter specifically referred to.

In the practical application of my invention, to provide for conveniently transporting my appliance from place to place, I mount the trough or the water holding tank upon a sled-like base and arrange the said base in the manner best shown in Figs. 1 and 2. By referring to the said figures of the drawings it will be noticed each runner is formed up from an angle iron or plate, the opposite ends of which are cut away to omit the vertical or side flange 1, and to provide for the more readily bending up the said portions to form the curved runner ends 2, each of which terminates in a flat flange 3 for engaging the ends 4 of the watering trough or pan 5. The pan 5, in the preferred construction shown in Figs. 1, 2 and 3, has its opposite sides 6 inclined inwardly, see Fig. 3, the purpose of which will presently appear and the upper edges of the said pan or trough are formed of angle plates 7, riveted to the said upper edges, and to provide for a strong and durable and water tight connection of the ends of the trough, I form the said ends of the trough by lapping, see 9, and make the angle plates with apertured extensions 10—10; and to still further provide for a strong connection of the ends of the trough or the pan, I connect the opposite ends 11 of the longitudinal or side braces 12 with the extensions 10, and secure the several parts by rivets as is clearly shown in the aforesaid Figs. 5 and 6.

The water holding means, in my construction of feeding appliance, consists of an inner and outer casing, preferably cylinders, the outer one 14 being of somewhat greater diameter than the inner one 13 open at the top and permanently attached at the lower end, by the flange and rivet connections 15, to the bottom of the pan or trough. The inner cylinder, which is open at the bottom and closed at the top, is loosely insertible within the outer cylinder and has a flange 16 at the lower edge that forms a rest for seating on the bottom of the said pan, it also having an annular flange 17 at the upper edge that substantially closes the upper end of the air space 18 that surrounds the inner cylinder 14, which cylinder it should be stated forms the water holding compartment since the outer cylinder acts, as it were, as a protector for the water chamber it holding off the direct sun rays from the sides of the water holder, it being obvious that in filling the holder by keeping the water level therein below the top of the holder constant air space is maintained above the water to protect it from the direct heat rays on the top of the holder. The inner holder, whose bottom is closed by the bottom of the pan has a valved filling inlet 18 in the top which also serves as an air vent cock while the inner cylinder is being filled, and at the lower end it has a pair of oppositely disposed outlets 20—20 that register with outlets 21 in the outer cylinder 13 through which the water passes into the trough or pan, the said outlets being internally threaded for receiving the stopper plugs 22, when it is desired to close off the pan from the water or feed supply.

By referring to Fig. 3, of the drawings it will be noticed the outer cylinder 14 is of a diameter equal the width of the pan between the upper edges of its opposite sides and since the said sides are inwardly inclined, continuous water passages 23—23 are provided for joining the troughs at each end of the appliance.

In some instances, particularly where the pan has compartments, one for water and the other for grain feed, and it is necessary that the compartments at each end be separated, the sides of the pan are made straight and securely riveted to the outer cylinder to form closures 24 at such points as indicated in the modified showing, see Fig. 8, that portion of the pan in front of the cylinder 14 in Fig. 8 being indicated as the grain compartment, and that portion of the pan to the rear of Fig. 8 being indicated as the water compartment.

The oppositely disposed longitudinal braces are turned, at points midway their length, to bear flatwise against the cylinder 14 to which they are riveted to form the outer or side braces for the cylinders or water holding parts of my appliance.

For bracing the opposite ends of the water holders or tanks, I prefer to use means shown in detail in Fig. 4, by reference to which it will be noticed the same consists of a single strap iron bent up to form longitudinal bracing loops 19 that extend from the lapped ends 25 which are secured to the cylinder 14 and form longitudinal braces 26 that engage with and are riveted to the ends of the trough or pan as is clearly shown in Figs. 1 and 2. The braces 26, extend parallel with the longitudinal side braces and serve, with the said braces, for forming guides that serve as stalls for keeping the heads of stock separated when drinking together. The braces 26 terminate in twisted and flattened portions 27 to engage and fasten to the cylinder 14 from whence they extend laterally and downwardly to form transversely disposed bracing arms 28. The arms 28 terminate in horizontal loops 29 for slipping over the horizontal flanges of the angled tops of the trough or pan sides to which they are riveted and the straps from the loops 29 are bent down to form side standards 30 that engage the sides of the pan. Between the standards 30, the strap extends as a transverse supporting member 31. It passes under the bottom of and engages the pan and at points near its ends, the member 31 is bent to form forked yokes 32 that seat upon, and are supported by, the vertical flanges of the runners 1.

Instead of making the transverse bracing means of a single strap of metal bent up to the shape shown and before described, the longitudinally projected braces 26, the pan supporting member 31 and the forked yokes 32 may all be separate members and joined up by riveting or otherwise, see Fig. 7, but on the score of economy and stability, I prefer to make the transverse yokes of the single strap irons bent up to the shape shown in Fig. 4, hereinbefore described in detail.

As an additional bracing element, I use a cross member 33 at the front or draft end of the appliance, which is centrally secured to the pan front 4 and whose ends are secured to the front ends of the runners, preferably by the same rivet or bolts 35 that join the draft chains 36 to the pan.

By reason of the peculiar arrangement of the several parts as described and shown, when either or both of the plugs for the outlets in the outer cylinder 14 are removed the water contained within the inner cylinder will flow out into the pan or trough until it reaches the level shown in Fig. 2, which shuts off the outflow openings in the inner and outer cylinders and in consequence cuts off the air to the inner cylinder. When the water level in the pan or trough falls below the said cylinder openings, air circulation is reestablished with the inner cylinder 13 and the water is again caused to flow into the pan until it reaches its normal level.

Since the water holder 13 is loosely held within the outer cylinder, that is, not fixedly connected at the lower end to the pan, the said inner cylinder can be conveniently removed when it is desired to cleanse the outer cylinder and the trough or pan.

The space between the two cylinders forms an air pocket which is substantially closed by the annular flange at the upper end of the inner cylinder, and since the said inner cylinder is thereby held out of direct rays of the sun the said pocket materially aids in keeping the water within the cylinder at a low temperature, and furthermore by providing a continuous passage between the sides of the pan and the outer cylinder only one set of the outfeed openings in the inner and outer cylinders need be used while the other set remains closed, particularly when that end of the trough where the water outfeeds are held closed is used for holding a mash of grain and water.

Having thus described my invention, what I claim is:—

1. In a stock feeder of the character stated; a trough, a support for the trough, feeding elements that automatically replenish the water for the trough, the said elements including a cylindrical holder, longitudinal brace members that form division guides, the said brace members extending from one end of the trough to the other end thereof and secured at their ends to the said trough ends, a transversely arranged bracing means for each end of the trough, each of the said bracing means including members secured to the cylinder and to the trough sides, and other members that extend parallel with the longitudinal brace members to form division guides, the said division guides being secured to the cylinder and to their respective ends of the trough.

2. In a stock feeder of the character stated, the combination with a drinking trough and means for automatically supplying water to the trough, the said means including a cylindrical casing that rests upon the trough bottom; of a portable supporting means for the trough, the said means including sled runners, longitudinal brace members secured at their ends to the trough ends and at points between their ends to the casing, and a transversely extended bracing means for each end of the trough, each of the said bracing means including portions that extend transversely under the sides and bottoms of the trough, other portions that brace the casing and the trough, and further portions pendent from the transversely extended portions that rest upon and are secured to the sled runners.

3. In a stock feeder of the character stated, the combination with a drinking trough and means for automatically supplying water to the trough, the said means including a cylindrical casing that rests upon the trough bottom, of a portable supporting means for the trough, the said means including sled runners, longitudinal brace members secured at their ends to the trough ends and at points between their ends to the casing, and a transversely extended bracing means for each end of the trough, each of the means for each end of the trough, each of the said bracing means including portions that extend transversely under the sides and bottoms of the trough, other portions that brace the casing and the trough, and further portions pendent from the transversely extended portions that rest upon and are secured to the sled runners, each of the said transversely extended bracing means being bent up to the shapes stated from a single strap member.

JOHN Q. CLARKE.

Witnesses:
 LENA JENKINS,
 J. O. SCHENCK.